(12) United States Patent
Zhao et al.

(10) Patent No.: US 12,304,266 B1
(45) Date of Patent: May 20, 2025

(54) EXPERIMENTAL PLATFORM FOR ELECTRO-HYDRAULIC SERVO ACTIVE SUSPENSIONS AND METHOD FOR FAULT DIAGNOSIS

(71) Applicant: YANSHAN UNIVERSITY, Qinhuangdao (CN)

(72) Inventors: Dingxuan Zhao, Qinhuangdao (CN); Haiwu Zheng, Qinhuangdao (CN); Hao Xiong, Qinhuangdao (CN)

(73) Assignee: YANSHAN UNIVERSITY, Qinhuangdao (CN)

( * ) Notice: Subject to any disclaimer, the term of this patent is extended or adjusted under 35 U.S.C. 154(b) by 0 days.

(21) Appl. No.: 19/021,276

(22) Filed: Jan. 15, 2025

(30) Foreign Application Priority Data

Dec. 13, 2023 (CN) .......................... 202311706809.1

(51) Int. Cl.
   *B60G 17/0185* (2006.01)

(52) U.S. Cl.
   CPC .... *B60G 17/0185* (2013.01); *B60G 2202/413* (2013.01); *B60G 2202/42* (2013.01); *B60G 2600/08* (2013.01)

(58) Field of Classification Search
   CPC .......... B60G 17/0185; B60G 2202/413; B60G 2202/42; B60G 2600/08
   See application file for complete search history.

(56) References Cited

U.S. PATENT DOCUMENTS

| | | | |
|---|---|---|---|
| 11,148,678 B2 * | 10/2021 | Lin | B60W 10/18 |
| 2003/0150509 A1 * | 8/2003 | Stiller | B60G 17/0155 |
| | | | 141/38 |
| 2004/0181329 A1 * | 9/2004 | Tseng | B60T 8/1755 |
| | | | 701/80 |
| 2012/0137760 A1 | 6/2012 | Burton | |

(Continued)

FOREIGN PATENT DOCUMENTS

| CN | 107894339 A | 4/2018 |
|---|---|---|
| CN | 115597894 A | 1/2023 |

OTHER PUBLICATIONS

Li Miaoshuo; et. al., Research of method and test for suspension system condition monitoring based on modal parameter identification, China Measurement & Test, vol. 43, No. 05, May 2017, pp. 138-144, China.

*Primary Examiner* — Toan C To
(74) *Attorney, Agent, or Firm* — True Shepherd LLC; Andrew C. Cheng (57) ABSTRACT

An experimental platform of the present disclosure is very close to an active suspension apparatus in a real vehicle. Fault feature data acquired on the basis of the experimental platform can well represent actual faults, so that a fault diagnosis model obtained on the basis of training of fault feature data sets has a relatively high practical value. According to the method of the present disclosure, noise reduction processing is performed on acquired vibration signals by combining with longitudinal displacement and lateral inclination angle data as well as positional relationships between vibration sensors of different hydraulic elements and an inertial sensor, and feature extraction is performed on vibration signals after noise reduction processing, so that constructed fault feature data sets are more accurate and more characteristic. The fault feature data sets are gradually expanded according to the actual faults, so that the fault diagnosis model has a certain self-learning capability.

8 Claims, 5 Drawing Sheets

(56) References Cited

U.S. PATENT DOCUMENTS

| | | | |
|---|---|---|---|
| 2014/0163820 A1* | 6/2014 | Nettelmann | B60G 17/0185 |
| | | | 701/37 |
| 2020/0300926 A1* | 9/2020 | Ikarashi | B60G 17/0185 |
| 2022/0048354 A1* | 2/2022 | Ikeda | H02M 7/44 |
| 2024/0288339 A1 | 8/2024 | Saari | |
| 2024/0418608 A1 | 12/2024 | Bouaru et al. | |
| 2025/0091401 A1* | 3/2025 | Calchand | B60G 13/14 |

* cited by examiner

EXPERIMENTAL PLATFORM FOR ELECTRO-HYDRAULIC SERVO ACTIVE SUSPENSIONS AND METHOD FOR FAULT DIAGNOSIS

CROSS-REFERENCE TO RELATED APPLICATIONS

This application claims priority to Chinese Patent Application No. 202311706809.1 with a filing date of Dec. 13, 2023. The content of the aforementioned application, including any intervening amendments thereto, is incorporated herein by reference.

TECHNICAL FIELD

The present disclosure relates to the technical field of fault diagnosis of active suspensions, and in particular, to an experimental platform for electro-hydraulic servo active suspensions and a method for fault diagnosis.

BACKGROUND

An automotive suspension system is a key to improve ride comfort and handling performance. An active suspension system can automatically adjust suspension stiffness according to road surface conditions, thereby improving ride comfort, driving performance, etc. After active suspensions have a fault, a passenger may feel relatively strong jolt and vibration, and meanwhile, the stability and handling performance of a vehicle during high-speed driving or turning will be affected, which may cause poor stability of the vehicle and even a risk of out of control. In addition, the fault of the active suspension system may cause an abnormality of the vehicle during driving, such as damage of a suspension component and inclination of a vehicle body, thereby affecting the driving safety, and in an extreme case, a traffic accident may even occur. Therefore, fault diagnosis is of great importance to the active suspensions of the vehicle.

The importance of the fault diagnosis of the active suspensions is that the problem of the suspension system can be detected and solved in time to ensure the driving safety and comfort of the vehicle. The active suspension system has a significant impact on handling performance and ride performance, and the fault thereof may cause the problems such as instability and aggravated vibration of the vehicle during driving, thereby seriously affecting driving quality. However, an existing method for fault diagnosis of active suspensions mainly includes the following defects:

1. The experimental platform of the active suspensions is greatly different from a real vehicle, resulting in a greater difference between acquired experimental data and actual working condition data, and finally resulting in a low diagnosis accuracy rate of a trained fault diagnosis model, which cannot be applied to practice.

2. The existing method does not consider the influence of the motion of the vehicle body itself on collected fault data during motion of the vehicle, that is, the obtained vibration signals have relatively strong noise interference, and there is a lack of a relevant noise reduction processing means.

Therefore, to solve the problems described above, there is an urgent need for an experimental platform for electro-hydraulic servo active suspensions and a method for fault diagnosis.

SUMMARY

For the problems described above, the present disclosure aims to provide an experimental platform for electro-hydraulic servo active suspensions and a method for fault diagnosis. The experimental platform very well reproduces an active suspension apparatus in a real vehicle, and acquired experimental data is very close to actual working condition data; meanwhile, noise reduction processing is performed on acquired vibration signals by combining with longitudinal displacement and lateral inclination angle data as well as positional relationships between vibration sensors of different hydraulic elements and an inertial sensor, and feature extraction is performed on vibration signals after noise reduction processing, so that constructed fault feature data sets are more accurate and more characteristic.

The present disclosure uses the following technical solutions:

An experimental platform for electro-hydraulic servo active suspensions includes a gantry frame mainly comprising a bottom plate and vertical columns, input signal actuators, a wheel suspension apparatus, a sprung mass block and an inertial sensor are sequentially arranged on the bottom plate of the gantry frame from bottom to top, an electro-hydraulic servo actuator is arranged on the wheel suspension apparatus, an upper part of the gantry frame is provided with counterweight blocks for increasing a weight of the sprung mass block, and a computer is arranged at one side of the gantry frame;

the wheel suspension apparatus includes wheels, shock absorbers, hydraulic cylinders, and cylinder body vibration sensors, the shock absorbers are arranged at upper parts of the wheels, the hydraulic cylinders are arranged behind the shock absorbers, the cylinder body vibration sensors are arranged on the hydraulic cylinders, and the sprung mass block is arranged above the shock absorbers and the hydraulic cylinders;

the electro-hydraulic servo actuator includes an oil tank, a hydraulic pump, valve body vibration sensors, servo valves, and a pump body vibration sensor, the hydraulic pump is in communication with a lower part of the oil tank, the oil tank and the hydraulic cylinders at two sides form an oil inlet circuit and an oil return circuit, respectively, the hydraulic pump and the servo valves are sequentially arranged on the oil inlet circuit, the pump body vibration sensor is arranged on the hydraulic pump, and the valve body vibration sensors are arranged on the servo valves.

A further improvement of the present disclosure lies in that: the gantry frame includes the bottom plate, the vertical columns, traction motors, and traction ropes, the vertical columns are arranged on a periphery of the bottom plate, and the traction motors are arranged above the vertical columns, the traction ropes are arranged below the traction motors, the counterweight blocks are fixed to the upper part of the gantry frame through locking buckles arranged on the vertical columns, the counterweight block each includes a counterweight body, fixing columns and lifting lugs, the fixing columns are arranged at a front end and a rear end of the counterweight body, and the lifting lugs for cooperating with the traction ropes to achieve lifting are arranged at two sides of the counterweight body.

A further improvement of the present disclosure lies in that: the weight of the sprung mass block is adjusted by increasing or decreasing the counterweight blocks, fixing columns are arranged at a front end and a rear end of the sprung mass block, the fixing columns are each of a semi-circular cylinder, and a semi-circular fixing cylinder between the sprung mass block and a counterweight block and a semi-circular fixing cylinder between the counterweight blocks are matched to form a circular cylinder and fixed through fastening rings; and when the counterweight blocks are not in use, the traction ropes hook the lifting lugs at the two sides, the counterweight blocks are driven by the traction motors to ascend to a set area, and then the counterweight blocks are fixed in the set area through the locking buckles.

A further improvement of the present disclosure lies in that: the input signal actuators below two wheels are independently controlled respectively, and actual road surface signal input is simulated by driving the wheels by the input signal actuators to actuate up and down.

A further improvement of a method for fault diagnosis of the present disclosure lies in: including the following steps:

S1: inputting an actuating signal to a wheel suspension apparatus by input signal actuators;

S2: adjusting and controlling an electro-hydraulic servo actuator according to a control solution;

S3: monitoring a longitudinal displacement and a lateral inclination angle of a sprung mass block by an inertial sensor, recording longitudinal displacement and lateral inclination angle data, and forming a curve of the longitudinal displacement and the lateral inclination angle changing with time, wherein a time interval of data recording is T;

S4: detecting vibration signals of servo valves, hydraulic cylinders and a hydraulic pump in an actuating state respectively by valve body vibration sensors, cylinder body vibration sensors and a pump body vibration sensor, and respectively recording the vibration signals according to different hydraulic elements, wherein a time interval of vibration signal recording is T, and recording beginning and ending time is consistent with that of the longitudinal displacement and the lateral inclination angle;

S5: performing noise reduction processing on acquired vibration signals by combining with acquired longitudinal displacement and lateral inclination angle data as well as positional relationships between vibration sensors of the different hydraulic elements and the inertial sensor;

S6: analyzing vibration signals after noise reduction respectively in a time domain and a frequency domain, and then extracting feature data of the vibration signals;

S7: respectively constructing fault feature data sets according to the different hydraulic elements and fault forms corresponding thereto;

S8: judging whether a fault feature data volume of the different hydraulic elements meets actual fault diagnosis requirements; if not, changing an input actuating signal form or increasing the counterweight blocks on the sprung mass block or repeating an experiment multiple times to acquire fault feature data under a same working condition, jumping to S1, and continuing to collect fault feature data of the different hydraulic elements; and if yes, proceeding to a next step;

S9: judging whether vibration signals under different fault forms in the different hydraulic elements are all recorded, and constructing fault feature data sets; if a hydraulic element having a set fault form is not recorded, correspondingly replacing a hydraulic element having a same model and having the set fault form in the experimental platform, and jumping to S1, thereby constructing a feature data set of the set fault form; otherwise, proceeding to a next step; and S10: respectively importing the fault feature data sets of the different hydraulic elements into a deep learning model for training to obtain fault diagnosis models of the different hydraulic elements, wherein in actual fault diagnosis, within a time interval T, a longitudinal displacement and a lateral inclination angle of a vehicle body and an actual vibration signal of a hydraulic element are monitored, equivalent processing in step S5 and step S6 is performed on the actual vibration signal, and a processed actual vibration signal is input into a fault diagnosis model of a corresponding hydraulic element to judge whether an actual hydraulic element has a fault, thereby completing fault diagnosis of active suspensions.

A further improvement of the method for fault diagnosis of the present disclosure lies in that: a method for noise reduction processing of vibration signals in step S5 is as follows:

assuming that acquired longitudinal displacement data is represented by a function D(t), in which an initial position is zero and upward is positive, and lateral inclination angle data is represented by a function φ(t), in which an initial position is zero and clockwise is positive; and assuming that a straight line distance between a vibration sensor of a certain hydraulic element and the inertial sensor is 1 and a horizontal included angle is θ, and a vibration signal monitored by the vibration sensor is L(t), a vibration signal generated by the vibration sensor under an influence of the sprung mass block is capable of being approximately D(t)+1*sin [φ(t)−θ]; and a vibration signal after noise reduction, M(t)=L(t)−D(t)−1*sin [φ(t)−θ]−ψ[L(t), D(t), φ(t)], is capable of being obtained, where ψ[L(t), D(t), φ(t)] is a phase error correction term of L(t), D(t) and φ(t).

A further improvement of the method for fault diagnosis of the present disclosure lies in that: a method for extracting fault feature data of the vibration signals in step S6 is as follows:

the vibration signals after noise reduction are converted to the time domain and the frequency domain, respectively, signal data with periodic repeated occurrence is highlighted in the time domain, high-frequency and low-amplitude signal data is filtered out in the frequency domain, and processed signal data is converted into a data type required by the deep learning model in step S10, thereby extracting the fault feature data; and when the vibration sensors and the inertial sensor have a relatively high sampling frequency and sampling precision and meanwhile, fault vibration signals of all hydraulic elements are capable of being acquired in a large quantity, step S6 is capable of being omitted, but in step S10, a model with a relatively strong feature extraction capability shall be selected as the deep learning model.

A further improvement of the method for fault diagnosis of the present disclosure lies in that: in the fault feature data sets constructed in step S7, a first-layer label is a name of a hydraulic element, and a second-layer label is a fault form corresponding to the hydraulic element, and in actual diagnosis by a fault diagnosis model, two layers of labels need to be output simultaneously.

A further improvement of the method for fault diagnosis of the present disclosure lies in that: the different fault forms in the different hydraulic elements in step S9 are set according to faults of hydraulic elements needing to be detected under actual working conditions.

A further improvement of the method for fault diagnosis of the present disclosure lies in that: the fault feature data sets are gradually expanded according to actual faults, a fault diagnosis model has a certain self-learning capability, and when an actual fault is consistent with a diagnosis result of the fault diagnosis model, an actual vibration signal after equivalent processing in step S5 and step S6 is added to a corresponding fault feature data set; and when the actual fault is inconsistent with the diagnosis result, the actual vibration signal after equivalent processing in step S5 and step S6 is added to a fault feature data set corresponding to the actual fault.

Compared with the prior art, the present disclosure has the following beneficial effects:

1. The experimental platform of the present disclosure is very close to an active suspension apparatus in a real vehicle, and the fault feature data acquired on the basis of the experimental platform can well represent actual faults, so that the fault diagnosis model obtained on the basis of the training of fault feature data sets can be applied to fault diagnosis of active suspensions of the real vehicle, and has a relatively high practical value.

2. The method of the present disclosure considers the influence of the motion of the vehicle body itself on collected fault data during motion of the vehicle, meanwhile, noise reduction processing is performed on the acquired vibration signals by combining with the longitudinal displacement and the lateral inclination angle data as well as the positional relationships between the vibration sensors of different hydraulic elements and the inertial sensor, and feature extraction is performed on vibration signals after noise reduction processing, so that constructed fault feature data sets are more accurate and more characteristic, and meanwhile, the fault feature data sets are gradually expanded according to the actual faults, so that the fault diagnosis model has a certain self-learning capability.

BRIEF DESCRIPTION OF THE DRAWINGS

FIG. 4 is a schematic structural diagram showing some components in

FIG. 1; and

Where, reference signs: 1—Gantry frame; 101—Bottom plate; 102—Vertical column; 103—Traction motor; 104—Traction rope; 2—Input signal actuator; 3—Wheel suspension apparatus; 301—Wheel; 302—Shock absorber; 303—Hydraulic cylinder; 304—Cylinder body vibration sensor; 4—Electro-hydraulic servo actuator; 401—Oil tank; 402—Hydraulic pump; 403—Valve body vibration sensor; 404—Servo valve; 405—Pump body vibration sensor; 5—Sprung mass block; 6—Inertial sensor; 7—Locking buckle; 8—Counterweight block; 801—Counterweight body; 802—Fixing column; 803—Lifting lug; 9—Computer.

DESCRIPTION OF THE EMBODIMENTS

To describe the technical solutions in the embodiments of the present disclosure or in the prior art more clearly, the following will briefly introduce the drawings required for describing the embodiments or the prior art. Apparently, the drawings in the following description show some embodiments of the present disclosure, and other drawings may also be obtained by those of ordinary skill in the art according to these drawings without paying out any creative effort.

It needs to be noted that in the description of the present disclosure, the orientation or position relationship indicated by the terms "upper", "lower", "top", "bottom", "one side", "other side", "left", "right", etc. is the orientation or position relationship shown based on the drawings, which is only for the convenience of describing the present disclosure and simplifying the description, rather than indicating that the apparatus or element must have a specific orientation and be constructed and operated in a specific orientation.

Figure 1:
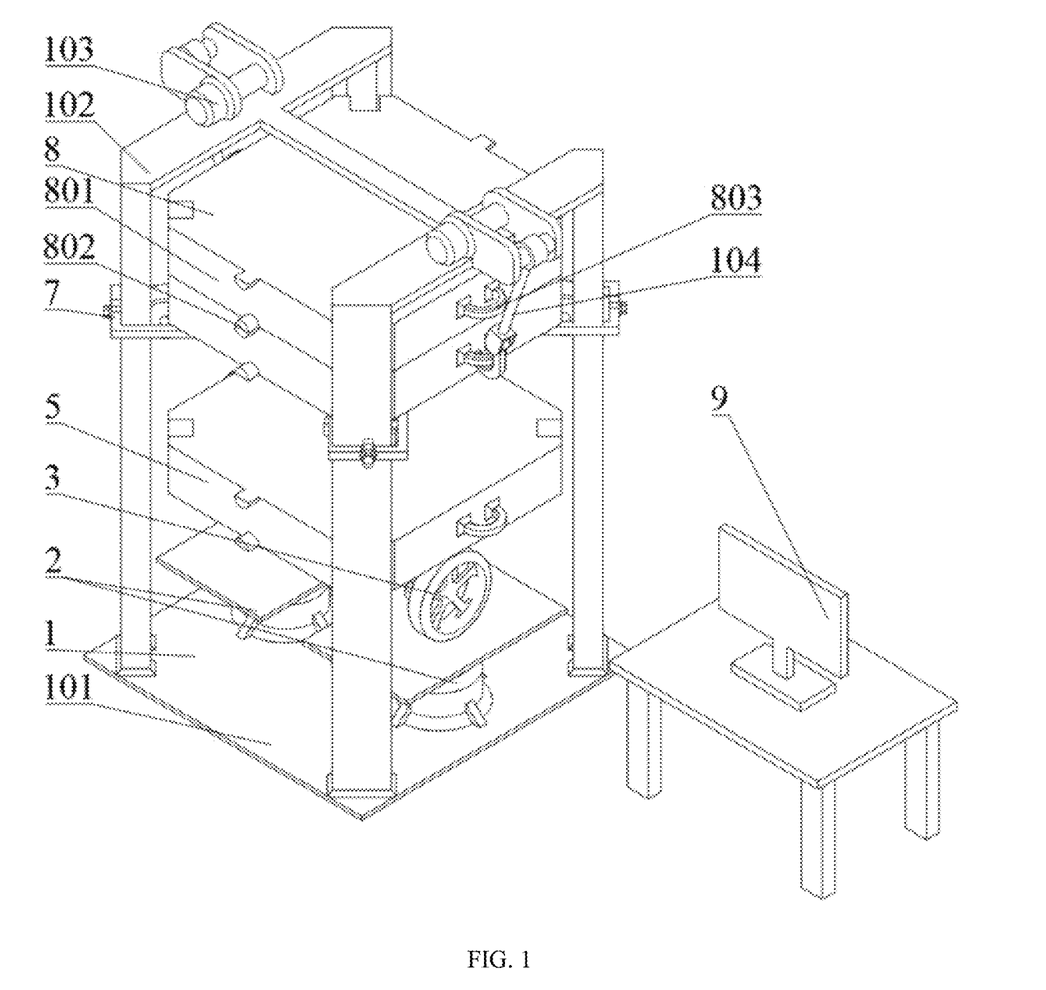
FIG. 1 is a schematic overall structural diagram showing an apparatus of the present disclosure.
Figure 2:
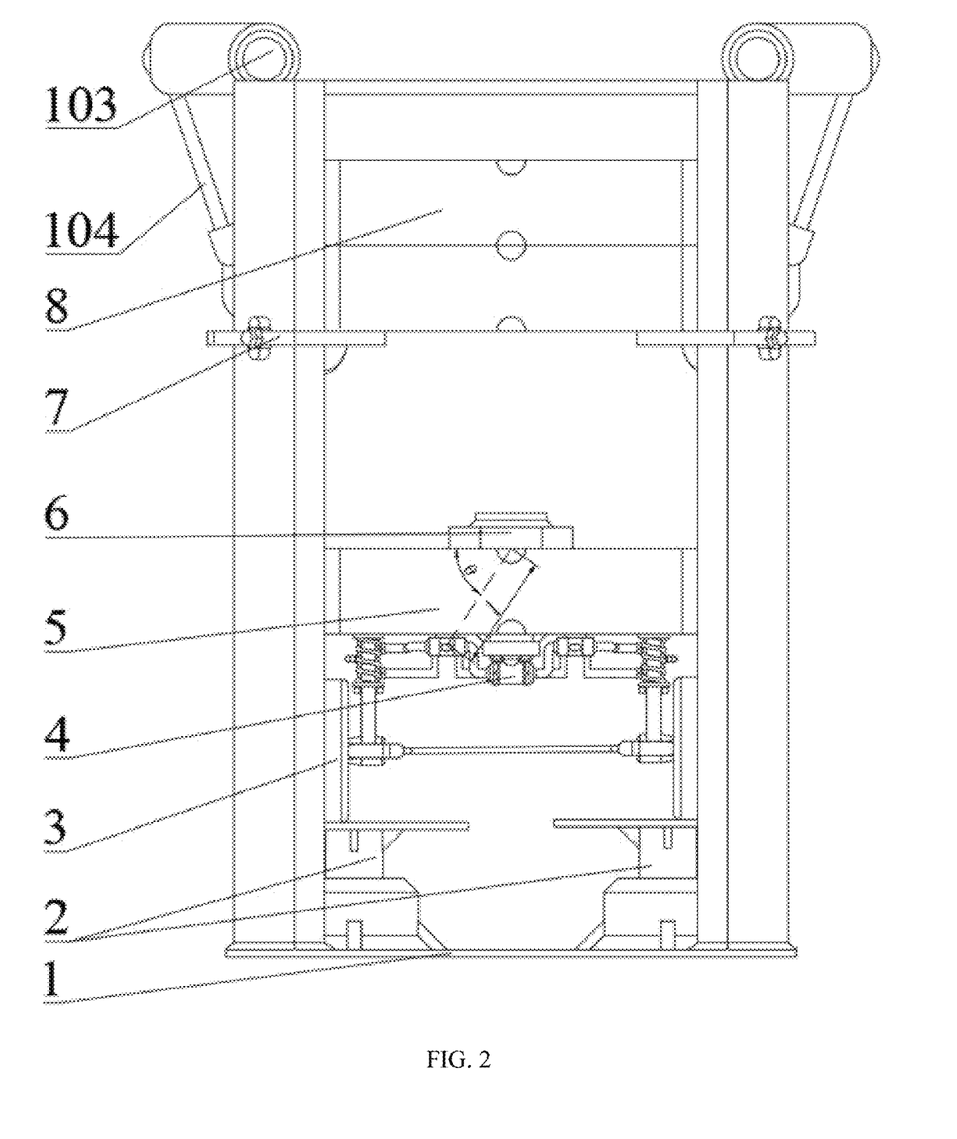
FIG. 2 is a front diagram showing an apparatus of the present disclosure.
Figure 3:
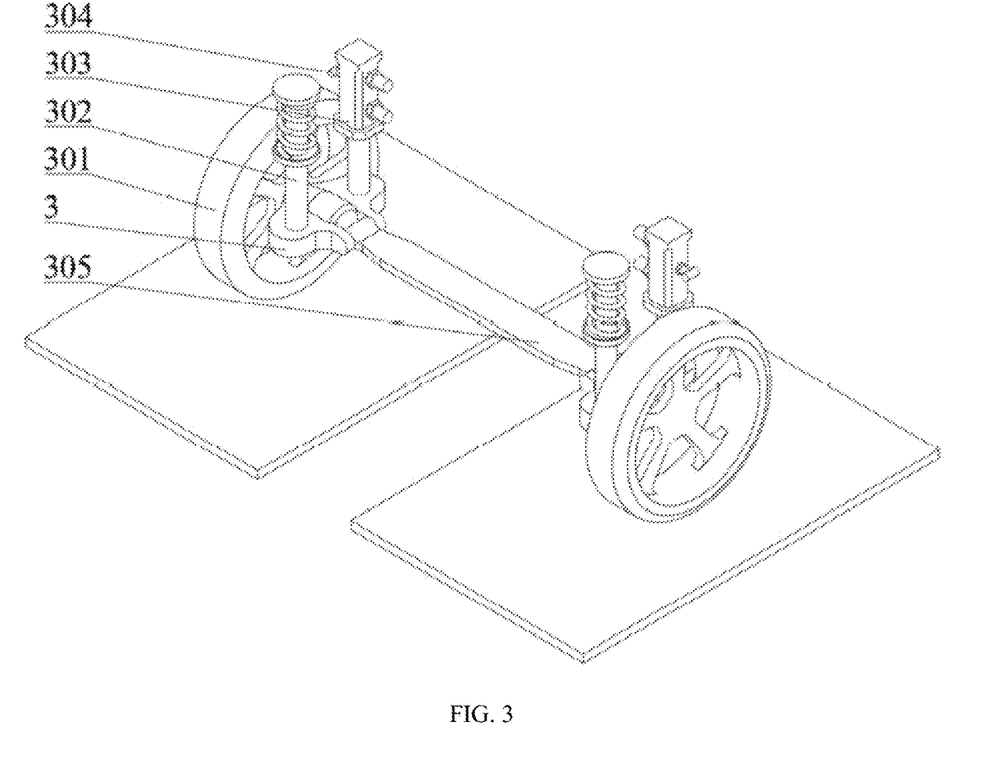
FIG. 3 is a schematic structural diagram showing a wheel suspension apparatus in an apparatus of the present disclosure.
Figure 4:
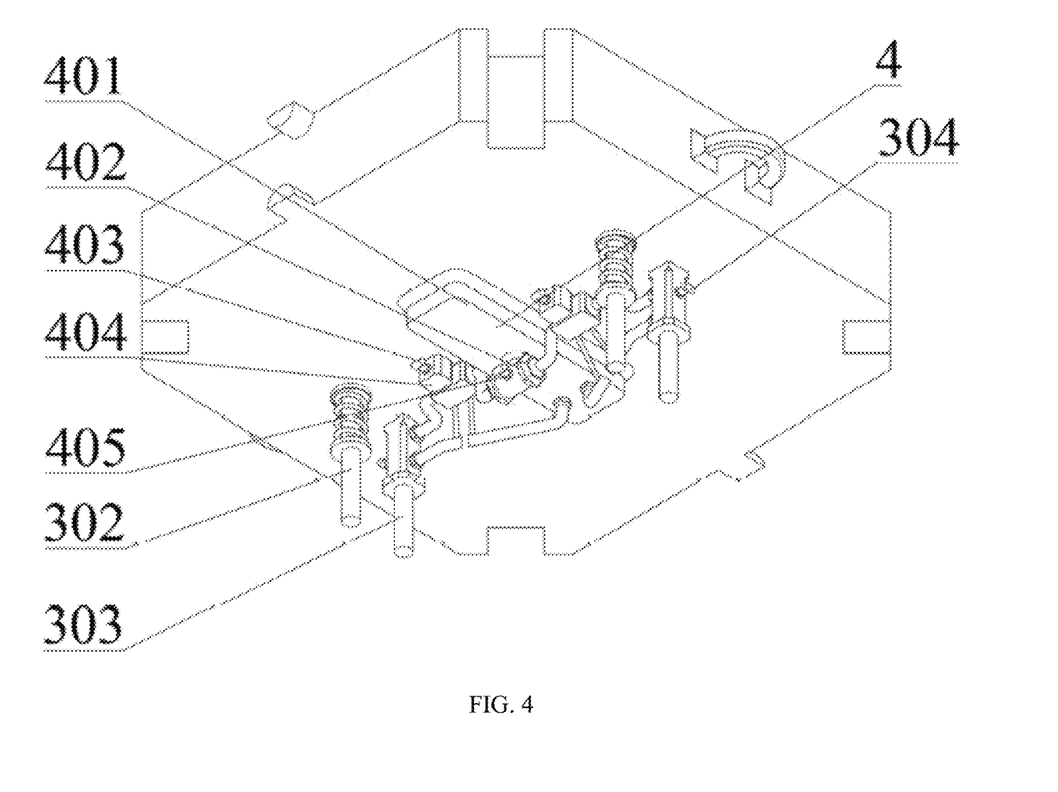

Referring to FIG. 1 to FIG. 4, provided is a specific structure of an embodiment of an experimental platform for electro-hydraulic servo active suspensions proposed by the present disclosure, including a gantry frame, input signal actuators, a wheel suspension apparatus, an electro-hydraulic servo actuator, a sprung mass block, an inertial sensor, locking buckles, counterweight blocks, and a computer, the input signal actuators are arranged on the gantry frame, the wheel suspension apparatus is arranged above the input signal actuators, the wheel suspension apparatus is provided with the electro-hydraulic servo actuator, the sprung mass block is arranged above the electro-hydraulic servo actuator, the inertial sensor is arranged above the sprung mass block, the locking buckles are arranged above the inertial sensor, the counterweight blocks are arranged above the locking buckles, and the computer is arranged at one side of the gantry frame;

The gantry frame includes a bottom plate, vertical columns, traction motors, and traction ropes, the vertical columns are arranged on the bottom plate, the traction motors are arranged above the vertical columns, and the traction ropes are arranged below the traction motors;

The wheel suspension apparatus includes wheels, shock absorbers, hydraulic cylinders, and cylinder body vibration sensors, the shock absorbers are arranged at upper parts of the wheels, the hydraulic cylinders are arranged behind the shock absorbers, and the cylinder body vibration sensors are arranged on the hydraulic cylinders;

The electro-hydraulic servo actuator includes an oil tank, a hydraulic pump, valve body vibration sensors, servo valves, and a pump body vibration sensor, the hydraulic pump is arranged below the oil tank, the pump body vibration sensor is arranged at a front end of the hydraulic pump, the servo valves are arranged at two sides of the hydraulic pump, and the valve body vibration sensors are arranged at front ends of the servo valves;

The counterweight block each includes a counterweight body, fixing columns and lifting lugs, the fixing columns are arranged at a front end and a rear end of the counterweight body, and the lifting lugs are arranged at two sides of the counterweight body.

The weight of the sprung mass block is adjusted by increasing or decreasing the counterweight blocks, fixing columns are also arranged at a front end and a rear end of the sprung mass block, the fixing columns are each of a semi-circular cylinder, and a semi-circular fixing cylinder between the sprung mass block and a counterweight block and a semi-circular fixing cylinder between the counterweight blocks are matched to form a circular cylinder and fixed through fastening rings; and when the counterweight blocks are not in use, the traction ropes hook the lifting lugs at the two sides, the counterweight blocks are driven by the traction motors to ascend to a set area, and then the counterweight blocks are fixed in the set area through the locking buckles.

The input signal actuators below two wheels are independently controlled respectively, and actual road surface signal input is simulated by driving the wheels by the input signal actuators to actuate up and down.

Figure 5:
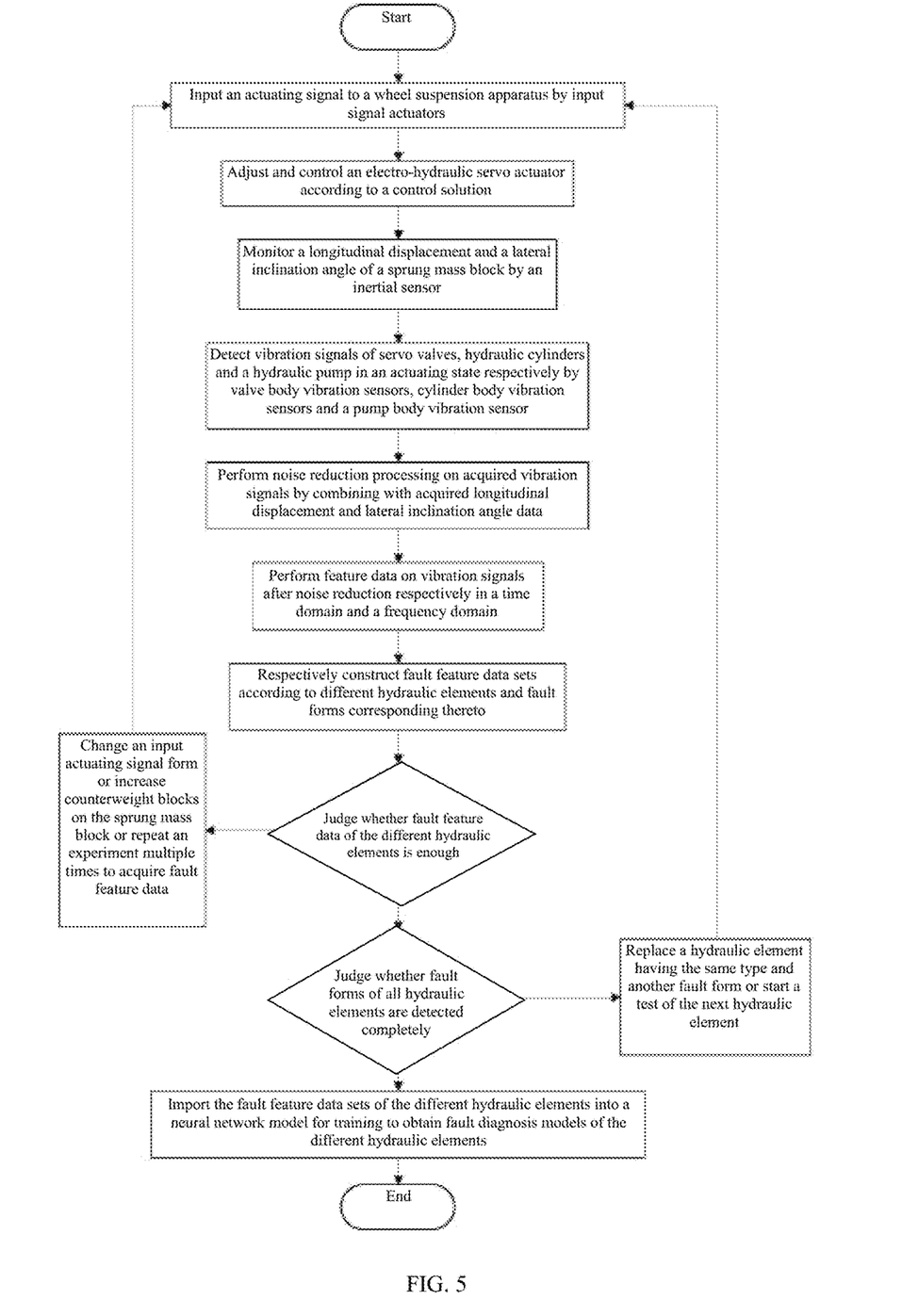
FIG. 5 is a schematic diagram showing an operation process of a method of the present disclosure.

Referring to FIG. 5, provided is a method for fault diagnosis of electro-hydraulic servo active suspensions, including the following steps:

S1: inputting an actuating signal to a wheel suspension apparatus by input signal actuators;

S2: adjusting and controlling an electro-hydraulic servo actuator according to a control solution;

S3: monitoring a longitudinal displacement and a lateral inclination angle of a sprung mass block by an inertial sensor, recording longitudinal displacement and lateral inclination angle data, and forming a curve of the longitudinal displacement and the lateral inclination angle changing with time, wherein a time interval of data recording is T;

S4: detecting vibration signals of servo valves, hydraulic cylinders and a hydraulic pump in an actuating state respectively by valve body vibration sensors, cylinder body vibration sensors and a pump body vibration sensor, and respectively recording the vibration signals according to different hydraulic elements, wherein a time interval of vibration signal recording is T, and recording beginning and ending time is consistent with that of the longitudinal displacement and the lateral inclination angle;

S5: performing noise reduction processing on acquired vibration signals by combining with acquired longitudinal displacement and lateral inclination angle data as well as positional relationships between vibration sensors of the different hydraulic elements and the inertial sensor;

S6: analyzing vibration signals after noise reduction respectively in a time domain and a frequency domain, and then extracting feature data of the vibration signals;

S7: respectively constructing fault feature data sets according to the different hydraulic elements and fault forms corresponding thereto;

S8: judging whether a fault feature data volume of the different hydraulic elements meets actual fault diagnosis requirements; if not, changing an input actuating signal form or increasing the counterweight blocks on the sprung mass block or repeating an experiment multiple times to acquire fault feature data under a same working condition, jumping to S1, and continuing to collect fault feature data of the different hydraulic elements; and if yes, proceeding to a next step;

S9: judging whether vibration signals under different fault forms in the different hydraulic elements are all recorded, and constructing fault feature data sets; if a hydraulic element having a set fault form is not recorded, correspondingly replacing a hydraulic element having a same model and having the set fault form in the experimental platform, and jumping to S1, thereby constructing a feature data set of the set fault form; otherwise, proceeding to a next step; and S10: respectively importing the fault feature data sets of the different hydraulic elements into a deep learning model for training to obtain fault diagnosis models of the different hydraulic elements, wherein for example, for a fault diagnosis model based on a deep belief network (DBN), firstly, the fault feature data sets in S7 are divided into training sets and test sets; then, a DBN model with multiple hidden layers is established, the number of input nodes of the DBN model is determined according to the dimension of fault samples, and the training sets are used to perform unsupervised training on the DBN model; then, the number of output layer nodes of the DBN model is determined according to the fault category, a BP algorithm is used to reversely fine-tune a weight and a threshold of the DBN model, the test sets are then used to test the trained DBN model, repeated iteration is performed according to the test result of the model, and finally, the trained model is used to perform fault diagnosis on actual data.

In actual fault diagnosis, within a time interval T, a longitudinal displacement and a lateral inclination angle of a vehicle body and an actual vibration signal of a hydraulic element are monitored, equivalent processing in step S5 and step S6 is performed on the actual vibration signal, and a processed actual vibration signal is input into a fault diagnosis model of a corresponding hydraulic element to judge whether an actual hydraulic element has a fault, thereby completing fault diagnosis of active suspensions.

A method for noise reduction processing of vibration signals in step S5 is as follows:

assuming that acquired longitudinal displacement data is represented by a function $D(t)$, in which an initial position is zero and upward is positive, and lateral inclination angle data is represented by a function $\varphi(t)$, in which an initial position is zero and clockwise is positive; and assuming that a straight line distance between a vibration sensor of a certain hydraulic element and the inertial sensor is $l$ and a horizontal included angle is $\theta$, and a vibration signal monitored by the vibration sensor is $L(t)$, a vibration signal generated by the vibration sensor under an influence of the sprung mass block is capable of being approximately $D(t)+l*\sin[\varphi(t)-\theta]$; and a vibration signal after noise reduction, $M(t)=L(t)-D(t)-l*\sin[\varphi(t)-\theta]-\psi[L(t), D(t), \varphi(t)]$, is capable of being obtained, where $\psi[L(t), D(t), \varphi(t)]$ is a phase error correction term of $L(t)$, $D(t)$ and $\varphi(t)$.

A method for extracting fault feature data of the vibration signals in step S6 is as follows:

the vibration signals after noise reduction are converted to the time domain and the frequency domain, respectively, signal data with periodic repeated occurrence is highlighted in the time domain, high-frequency and low-amplitude signal data is filtered out in the frequency domain, and processed signal data is converted into a data type required by the deep learning model in step S10, thereby extracting the fault feature data; and when the vibration sensors and the inertial sensor have a relatively high sampling frequency and sampling precision and meanwhile, fault vibration signals of all hydraulic elements are capable of being acquired in a large quantity, step S6 is capable of being omitted, but in step S10, a model with a relatively strong feature extraction capability shall be selected as the deep learning model; model algorithms that can be considered include convolutional neural networks (CNNs), recurrent neural networks (RNNs), etc.; firstly, data format conversion is performed on the fault feature data sets constructed in step S7 according to the selected deep learning model, so that the fault feature data sets conform to an input data format of a corresponding deep learning model, then, the converted fault feature data sets are divided into training sets and test sets, and the training sets are input to the corresponding deep learning models for feature extraction and pattern recognition to obtain a corresponding fault diagnosis model; meanwhile, the test sets are used to test the fault diagnosis model, repeated iteration is performed according to the test result of the model, and finally, the trained model is used to perform fault diagnosis on actual data.

In the fault feature data sets constructed in step S7, a first-layer label is a name of a hydraulic element, and a second-layer label is a fault form corresponding to the hydraulic element, and in actual diagnosis by a fault diagnosis model, two layers of labels need to be output simultaneously.

The different fault forms in the different hydraulic elements in step S9 are set according to faults of hydraulic elements needing to be detected under actual working conditions.

The fault feature data sets are gradually expanded according to actual faults, a fault diagnosis model has a certain self-learning capability, and when an actual fault is consistent with a diagnosis result of the fault diagnosis model, an actual vibration signal after equivalent processing in step S5 and step S6 is added to a corresponding fault feature data set; and when the actual fault is inconsistent with the diagnosis result, the actual vibration signal after equivalent processing in step S5 and step S6 is added to a fault feature data set corresponding to the actual fault.

The differences between the experimental platform for electro-hydraulic servo active suspensions and the method for fault diagnosis of the present disclosure and the apparatus in the prior art lie in that: the experimental platform of the present disclosure is very close to an active suspension apparatus in a real vehicle, and the fault feature data acquired on the basis of the experimental platform can well represent actual faults, so that the fault diagnosis model obtained on the basis of the training of fault feature data sets can be applied to fault diagnosis of active suspensions of the real vehicle, and has a relatively high practical value.

The differences between the experimental platform for electro-hydraulic servo active suspensions and the method for fault diagnosis of the present disclosure and the apparatus in the prior art lie in that: the method of the present disclosure considers the influence of the motion of the vehicle body itself on collected fault data during motion of the vehicle, meanwhile, noise reduction processing is performed on the acquired vibration signals by combining with the longitudinal displacement and the lateral inclination angle data as well as the positional relationships between the vibration sensors of different hydraulic elements and the inertial sensor, and feature extraction is performed on vibration signals after noise reduction processing, so that constructed fault feature data sets are more accurate and more characteristic, and meanwhile, the fault feature data sets are gradually expanded according to the actual faults, so that the fault diagnosis model has a certain self-learning capability.

The embodiments described above merely describe the preferred implementations of the present disclosure, but do not limit the scope of the present disclosure, and without departing from the design spirit of the present disclosure, any modifications and improvements made to the technical solutions of the present disclosure by those skilled in the art shall fall within the scope of protection determined by the claims of the present disclosure.

What is claimed is:

1. A method for fault diagnosis of electro-hydraulic servo active suspensions, wherein an experimental platform for the electro-hydraulic servo active suspensions is adopted, and the experimental platform comprises a gantry frame mainly comprising a bottom plate and vertical columns, input signal actuators, a wheel suspension apparatus, a sprung mass block and an inertial sensor are sequentially arranged on the bottom plate of the gantry frame from bottom to top, an electro-hydraulic servo actuator is arranged on the wheel suspension apparatus, an upper part of the gantry frame is provided with counterweight blocks for increasing a weight of the sprung mass block, and a computer is arranged at one side of the gantry frame;

the wheel suspension apparatus comprises wheels, shock absorbers, hydraulic cylinders, and cylinder body vibration sensors, the shock absorbers are arranged at upper parts of the wheels, the hydraulic cylinders are arranged behind the shock absorbers, the cylinder body vibration sensors are arranged on the hydraulic cylinders, and the sprung mass block is arranged above the shock absorbers and the hydraulic cylinders;

the electro-hydraulic servo actuator comprises an oil tank, a hydraulic pump, valve body vibration sensors, servo valves, and a pump body vibration sensor, the hydraulic pump is in communication with a lower part of the oil tank, the oil tank and the hydraulic cylinders at two sides form an oil inlet circuit and an oil return circuit, respectively, the hydraulic pump and the servo valves are sequentially arranged on the oil inlet circuit, the pump body vibration sensor is arranged on the hydraulic pump, and the valve body vibration sensors are arranged on the servo valves; and the method for fault diagnosis comprises the following steps:

S1: inputting an actuating signal to the wheel suspension apparatus by the input signal actuators;

S2: adjusting and controlling the electro-hydraulic servo actuator according to a control solution;

S3: monitoring a longitudinal displacement and a lateral inclination angle of the sprung mass block by the inertial sensor, recording longitudinal displacement and lateral inclination angle data, and forming a curve of the longitudinal displacement and the lateral inclination angle changing with time, wherein a time interval of data recording is T;

S4: detecting vibration signals of the servo valves, the hydraulic cylinders and the hydraulic pump in an actuating state respectively by the valve body vibration sensors, the cylinder body vibration sensors and the pump body vibration sensor, and respectively recording the vibration signals according to different hydraulic elements, wherein a time interval of vibration signal recording is T, and recording beginning and ending time is consistent with that of the longitudinal displacement and the lateral inclination angle;

S5: performing noise reduction processing on acquired vibration signals by combining with acquired longitudinal displacement and lateral inclination angle data as well as positional relationships between vibration sensors of the different hydraulic elements and the inertial sensor;

S6: analyzing vibration signals after noise reduction respectively in a time domain and a frequency domain, and then extracting feature data of the vibration signals;

S7: respectively constructing fault feature data sets according to the different hydraulic elements and fault forms corresponding thereto;

S8: judging whether a fault feature data volume of the different hydraulic elements meets actual fault diagnosis requirements; if not, changing an input actuating signal form or increasing the counterweight blocks on the sprung mass block or repeating an experiment multiple times to acquire fault feature data under a same working condition, jumping to S1, and continuing to collect fault feature data of the different hydraulic elements; and if yes, proceeding to a next step;

S9: judging whether vibration signals under different fault forms in the different hydraulic elements are all recorded, and constructing fault feature data sets; if a hydraulic element having a set fault form is not recorded, correspondingly replacing a hydraulic element having a same model and having the set fault form in the experimental platform, and jumping to S1, thereby constructing a feature data set of the set fault form; otherwise, proceeding to a next step; and S10: respectively importing the fault feature data sets of the different hydraulic elements into a deep learning model for training to obtain fault diagnosis models of the different hydraulic elements, wherein in actual fault diagnosis, within a time interval T, a longitudinal displacement and a lateral inclination angle of a vehicle body and an actual vibration signal of a hydraulic element are monitored, equivalent processing in step S5 and step S6 is performed on the actual vibration signal, and a processed actual vibration signal is input into a fault diagnosis model of a corresponding hydraulic element to judge whether an actual hydraulic element has a fault, thereby completing fault diagnosis of active suspensions; and a method for noise reduction processing of vibration signals in step S5 is as follows:

assuming that acquired longitudinal displacement data is represented by a function D(t), in which an initial position is zero and upward is positive, and lateral inclination angle data is represented by a function φ(t), in which an initial position is zero and clockwise is positive; and assuming that a straight line distance between a vibration sensor of a certain hydraulic element and the inertial sensor is 1 and a horizontal included angle is θ, and a vibration signal monitored by the vibration sensor is L(t), a vibration signal generated by the vibration sensor under an influence of the sprung mass block is capable of being approximately D(t)+1*sin [φ(t)−θ]; and a vibration signal after noise reduction, M(t)=L(t)−D(t)−1*sin [φ(t)−θ]−ψ[L(t), D(t), φ(t)], is capable of being obtained, where ψ[L(t), D(t), φ(t)] is a phase error correction term of L(t), D(t) and φ(t).

2. The method according to claim 1, wherein a method for extracting fault feature data of the vibration signals in step S6 is as follows:

the vibration signals after noise reduction are converted to the time domain and the frequency domain, respectively, signal data with periodic repeated occurrence is highlighted in the time domain, high-frequency and low-amplitude signal data is filtered out in the frequency domain, and processed signal data is converted into a data type required by the deep learning model in step S10, thereby extracting the fault feature data; and when the vibration sensors and the inertial sensor have a relatively high sampling frequency and sampling precision and meanwhile, fault vibration signals of all hydraulic elements are capable of being acquired in a large quantity, step S6 is capable of being omitted, but in step S10, a model with a relatively strong feature extraction capability is selected as the deep learning model.

3. The method according to claim 1, wherein in the fault feature data sets constructed in step S7, a first-layer label is a name of a hydraulic element, and a second-layer label is a fault form corresponding to the hydraulic element, and in actual diagnosis by a fault diagnosis model, two layers of labels need to be output simultaneously.

4. The method according to claim 1, wherein the different fault forms in the different hydraulic elements in step S9 are set according to faults of hydraulic elements needing to be detected under actual working conditions.

5. The method according to claim 1, wherein the fault feature data sets are gradually expanded according to actual faults, a fault diagnosis model has a certain self-learning capability, and when an actual fault is consistent with a diagnosis result of the fault diagnosis model, an actual vibration signal after equivalent processing in step S5 and step S6 is added to a corresponding fault feature data set; and when the actual fault is inconsistent with the diagnosis result, the actual vibration signal after equivalent processing in step S5 and step S6 is added to a fault feature data set corresponding to the actual fault.

6. The method according to claim 1, wherein the gantry frame comprises the bottom plate, the vertical columns, traction motors, and traction ropes, the vertical columns are arranged on a periphery of the bottom plate, and the traction motors are arranged above the vertical columns, the traction ropes are arranged below the traction motors, the counterweight blocks are fixed to the upper part of the gantry frame through locking buckles arranged on the vertical columns, the counterweight block each comprises a counterweight body, fixing columns and lifting lugs, the fixing columns are arranged at a front end and a rear end of the counterweight body, and the lifting lugs for cooperating with the traction ropes to achieve lifting are arranged at two sides of the counterweight body.

7. The method according to claim 6, wherein the weight of the sprung mass block is adjusted by increasing or decreasing the counterweight blocks, fixing columns are arranged at a front end and a rear end of the sprung mass block, the fixing columns are each of a semi-circular cylinder, and a semi-circular fixing cylinder between the sprung mass block and a counterweight block and a semi-circular fixing cylinder between the counterweight blocks are matched to form a circular cylinder and fixed through fastening rings; and when the counterweight blocks are not in use, the traction ropes hook the lifting lugs at the two sides, the counterweight blocks are driven by the traction motors to ascend to a set area, and then the counterweight blocks are fixed in the set area through the locking buckles.

8. The method according to claim 1, wherein the input signal actuators below two wheels are independently controlled respectively, and actual road surface signal input is simulated by driving the wheels by the input signal actuators to actuate up and down.

* * * * *